Nov. 26, 1935.  A. ABEL  2,022,451
DEVICE FOR MEASURING LENGTHS OF CLOTH AND SIMILAR MATERIAL
Filed June 20, 1929  2 Sheets-Sheet 1

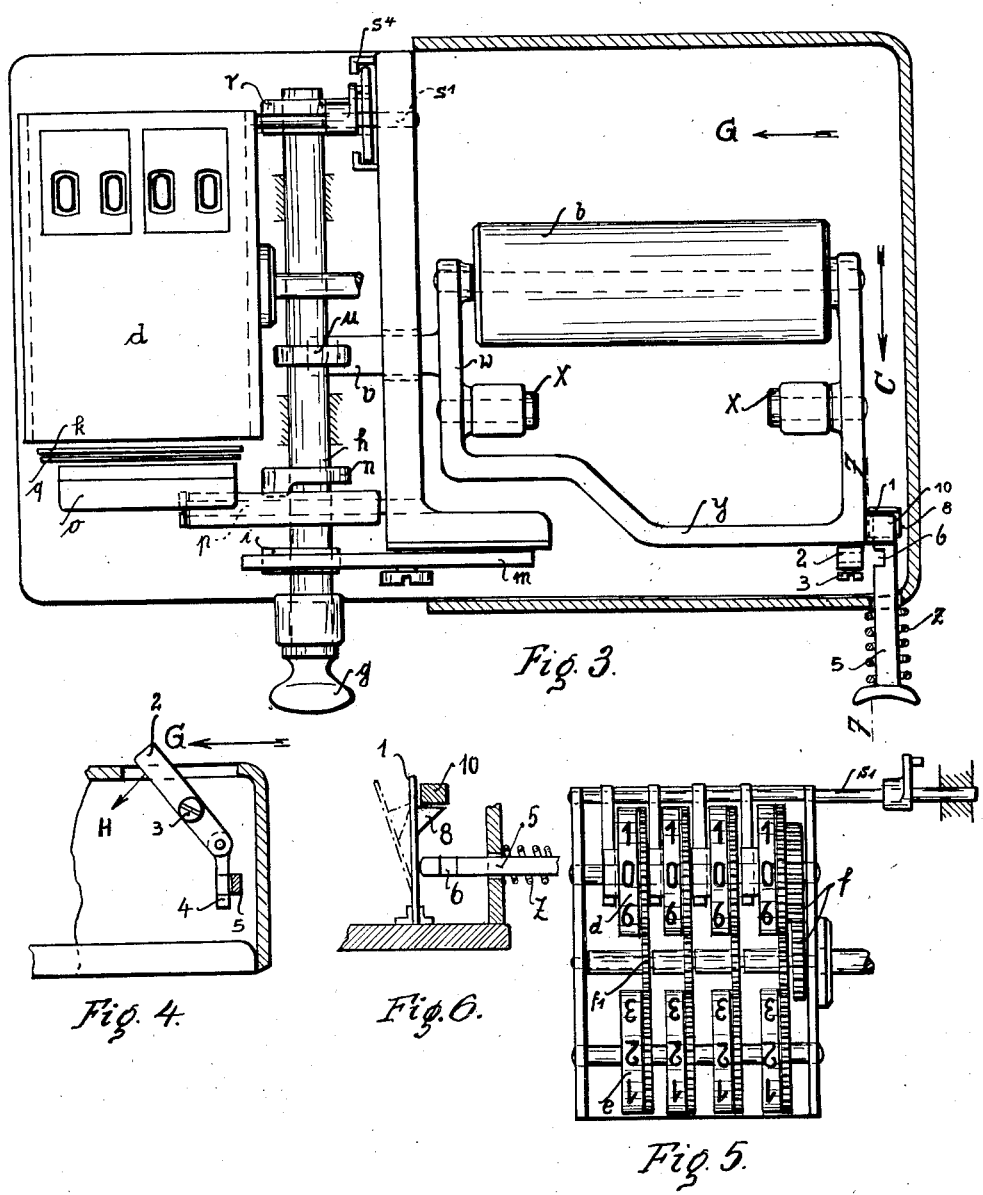

Patented Nov. 26, 1935

2,022,451

UNITED STATES PATENT OFFICE 2,022,451

DEVICE FOR MEASURING LENGTHS OF CLOTH AND SIMILAR MATERIAL

Adolf Abel, Duisburg, Germany

Application June 20, 1929, Serial No. 372,494
In Germany May 28, 1929

1 Claim. (Cl. 33—130)

Apparatus for measuring cloths are known in which the cloth to be measured is fed between a measuring roll and a presser roll, the measuring roll being connected with a counting and printing mechanism.

It is likewise known to incise the cloth to indicate the measured length, to zeroize the counting and printing mechanism after taking a measurement, to bar the passage for the cloth until a fresh measurement is taken and to move the presser roll away from the measuring roll after taking a measurement.

These devices in the known arrangements are however, only employed individually and independently.

The invention consists in combining these devices and positively actuating all of same successively by merely turning a crank.

An embodiment of the invention is illustrated by way of example in the accompanying drawings in which:

Fig. 3 is a top plan view of Fig. 1 with certain parts removed.

Fig. 4 shows the locking device in the locking position.

Figure 5 shows in top plan view the gearing between the measuring roll and the counting and printing mechanisms, and Figure 6 is a section on line 7—7 of Figure 3.

Figure 1:
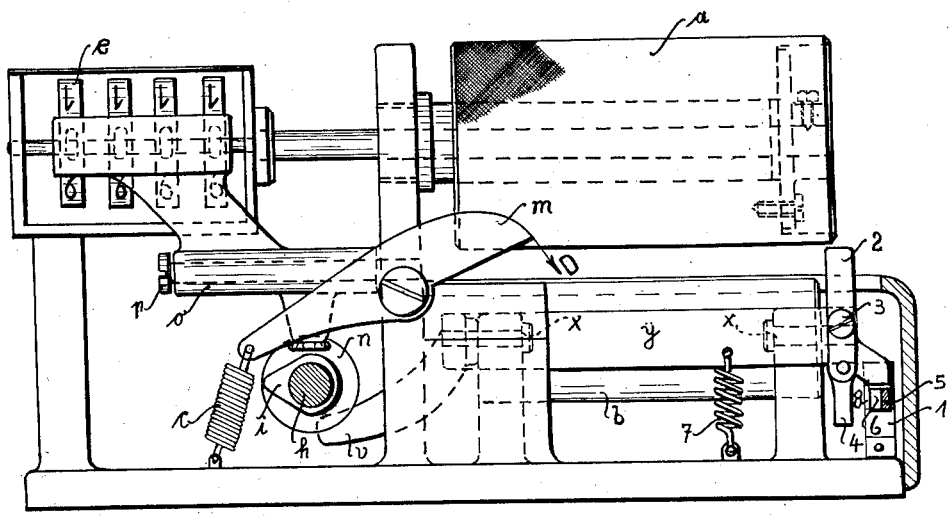
Fig. 1 shows in front elevation the apparatus with certain parts removed.
Figure 2:
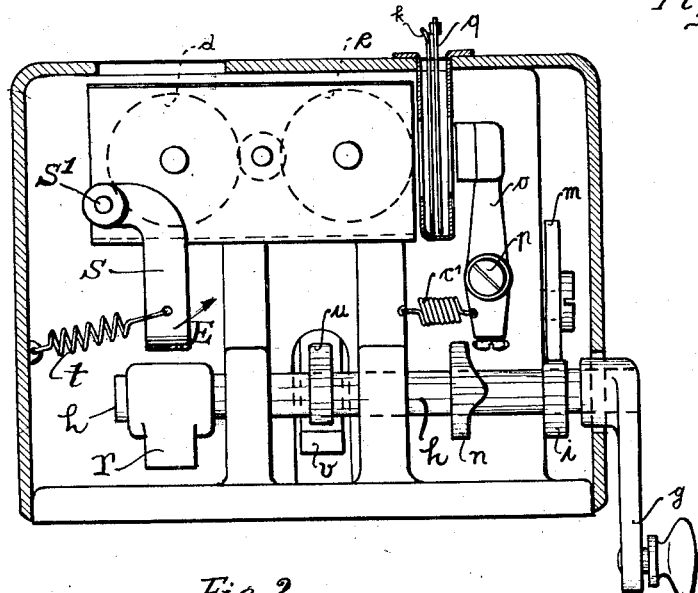
Fig. 2 is a side elevation of Fig. 1 partly in section.

The cloth to be measured is pulled through in known manner between a measuring roll $a$ and a presser roll $b$ capable of being pressed thereon, the actual length of cloth being indicated by a rotary counting mechanism $d$ and a ticket $q$ printed with the length of cloth obtained by the measuring, by means of a printing mechanism $e$ positively connected with the counting mechanism $d$. The measuring is effected by the measuring roll $a$ rotated by the pulling through of the cloth in the direction of the arrow C (Fig. 3), through the intermediary of gear wheels $f$ to the rotary counting mechanism $d$ while the printing mechanism $e$ is simultaneously actuated by the gear wheels $f'$ and shows the same figure as the counting mechanism, this being most suited for reading and printing. When the measuring has been completed, that is when a certain length of cloth has been pulled through, a crank $g$ is turned for example 360°, whereby through the shaft $h$ the individual cams arranged on the shaft actuate successively the individual devices. The cam $i$ first encounters the knife $m$ and moves the same downwards in the direction of the arrow D (Fig. 1) for cutting the cloth; almost at the same time the cam $n$ encounters the printing lever $o$, which rotates around the pivot $p$ towards the ticket $q$ inserted by hand between this and the type of the printing mechanism $e$, an ink ribbon $k$ being arranged between the label and the striking lever in known manner (Fig. 2). The label is thus printed with the figure appearing on the printing mechanism $e$. After cutting and printing, the cams $i$ and $n$ release the knife $m$ and the printing lever $o$, both parts returning to their initial position by means of springs $c$ and $c'$. On the further rotation of the crank $g$ the counting and printing mechanisms are brought to their zero position in that the cam $r$ moves the elbow lever $s$ in the direction of the arrow E (Fig. 2) and thereby rotates a zeroizing shaft $S'$ of the counting and printing mechanisms. This zeroizing mechanism is of a conventional type known in the prior art as suggested by the patent granted to D. Turner for Register and fabric measuring machines, Patent 1,429,983, dated September 26, 1922. The elbow lever $s$, after being released by the cam $r$, is brought back to its initial position by the spring $t$. The lowering of the presser roll $b$ takes place with or subsequent to the zeroizing movement. This lowering movement is effected through the cam $u$ keyed on the shaft $h$ and the stop $v$ which moves the frame $w$ of the presser roll, rotatably mounted on pin $x$, (Fig. 3). The frame $w$ extends beyond its pin $x$ into the part $y$ and its cam 10, when the presser roll $b$ is in lowered position under the action of cam $u$ against the pull of a spring 7, bears on the nose 8 of the snap spring 1 for the purpose of locking, the roll $b$ remaining in lowered position (Fig. 7). By pressing the knob 5 against the action of a spring $z$ the snap spring 1 is brought into the position indicated in dot-dash lines, in which the nose 8 liberates the cam 10 and consequently the frame part $y$, so that the frame $w$, $y$ is turned around its pin $x$ by the spring 7 until the presser roll $b$ bears against the measuring roll $a$. The knob 5 can however only be actuated when a lever 2, oscillatably mounted on a bolt 3 on the frame part $y$, stands in vertical position as shown in Fig. 1, as in the event of an inclining of the lever, due to the cloth web not being properly positioned, the pendulum 4 as shown in Fig. 4 engages the slot 6 in the knob 5 and thus prevents the operation of the knob 5 and the releasing of the snap spring 1. For this purpose it is necessary for the bearing edge of the lever 2 and the cutting edge of the knife m to be in alinement.

The function of the lever 2 is as follows:—

The front end of cloth web is placed in the gap between the rolls a and b. If it is not in the proper position but projects laterally beyond the outer ends of the rolls, the projecting portion of the cloth web will bear against the upper arm of the two-armed lever 2, cause the same to swing about its pivot bolt 3 and bring the pendulum 4 into engagement with the slot 6 in the knob 5, thereby locking this knob and preventing its operation. The lever 2 is maintained in its locking position as long as the cloth web bears against its upper arm, that is, is not in the proper position between the rolls a and b. To bring the cloth web into its proper position between the rolls a and b it must be shifted laterally. During this lateral movement the cloth web will slide over the lever 2 until, when in its proper position, it finally releases the same. This lever will then swing back into its initial position and disengage the pendulum 4 from the slot 6, thus unlocking the knob 5, which can now be pressed for starting the machine.

In the position shown the measuring apparatus is ready for measuring, the rolls a and b are apart and the cloth to be measured can be introduced between them in a direction parallel to the axis thereof until it bears against the lever 2 insures that the cloth is not too far advanced through the rolls in a lateral sense when the measurement is begun. When the cloth is properly situated the knob 5 is pressed and the presser roll b is raised and presses the cloth against the measuring roll a, the lever 2 at the same time moving out of the path of the cloth. The cloth is then pulled between the rolls until the counting mechanism indicates the desired length. The crank g is then turned through 360°. By turning the crank the individual devices are successively operated in the manner above described so that after completing the turning movement, the apparatus is ready for taking a fresh measurement. The individual parts, such as the counting mechanism, printing mechanism, marking device and zeroizing mechanism for the counting and printing mechanisms are themselves known and the novelty and peculiarity consist in the common and positive operation by one handle.

I claim:

A device for measuring lengths of cloth, comprising in combination a measuring roll, a presser roll under said measuring roll constituting means for pressing the cloth against the measuring roll during the measuring operation, a counting mechanism, a toothed gearing positively connecting said counting mechanism to said measuring roll and adapted to be actuated by the rotation of said measuring roll, a printing mechanism, a second toothed gearing positively connecting said printing mechanism to said counting mechanism and adapted to set said printing mechanism to the same figure as that indicated by said counting mechanism during the rotation of said measuring roll, means for zeroizing said counting mechanism and zeroizing said printing mechanism, printing means adapted to press the label to be printed against said printing mechanism, marking means for incising the cloth at the termination of a measurement, means for lowering said presser roll from said measuring roll, and a common element adapted in a single operation to successively actuate said printing means, said counting and printing mechanism zeroizing means, and said presser roll lowering means.

ADOLF ABEL.